United States Patent [19]

Nakaya et al.

[11] 4,437,016
[45] Mar. 13, 1984

[54] POWER ABSORBING DEVICE FOR LOW-TEMPERATURE REFRIGERATING MACHINE

[75] Inventors: Shunichi Nakaya, Kawasaki; Katsumasa Araoka, Yokohama, both of Japan

[73] Assignee: Tokyo Shibaura Denki Kabushiki Kaisha, Kawasaki, Japan

[21] Appl. No.: 345,017

[22] Filed: Feb. 2, 1982

[30] Foreign Application Priority Data

Feb. 27, 1981 [JP] Japan .................................. 56-28223

[51] Int. Cl.³ .................................. H02K 51/00
[52] U.S. Cl. .................................. 290/1 R; 74/57
[58] Field of Search .................. 290/1 R; 310/82, 83; 318/9, 14, 15; 74/52, 57, 750 R

[56] References Cited

U.S. PATENT DOCUMENTS

| | | | |
|---|---|---|---|
| 1,195,665 | 8/1916 | Etter | 74/57 |
| 3,974,718 | 8/1976 | Kylberg | 74/750 R |
| 4,275,616 | 6/1981 | Ehrlinger et al. | 74/750 R X |
| 4,337,399 | 6/1982 | Nakamura et al. | 290/1 R |

*Primary Examiner*—J. V. Truhe
*Assistant Examiner*—W. E. Duncanson, Jr.
*Attorney, Agent, or Firm*—Oblon, Fisher, Spivak, McClelland & Maier

[57] ABSTRACT

A power absorbing device according to the present invention is a device for absorbing the mechanical energy of reciprocating motion of pistons of a reciprocating adiabatic expansion engine, comprising a cylindrical cam having a hollow space therein and converting the reciprocating motion of the pistons into rotatory motion, a speed-increasing gear disposed in the hollow space to increase the speed of the rotary motion and having an output shaft to rotate at an increased speed, and an electric generator including a rotor mounted on the output shaft to rotate and an electric generating section operating jointly with the rotor to supply an external load with electric power.

4 Claims, 5 Drawing Figures

POWER ABSORBING DEVICE FOR LOW-TEMPERATURE REFRIGERATING MACHINE

BACKGROUND OF THE INVENTION

This invention relates to a power absorbing device which comprises a converter for converting reciprocating motion of pistons of a reciprocating adiabatic expansion engine used for a low-temperature refrigerating machine into rotary motion, a speed-increasing gear for increasing the speed of the rotary motion, and an electric generator driven by the speed-increasing gear, and absorbs the energy of the reciprocating motion of the pistons.

Power absorbing devices of this type used for reciprocating adiabatic expansion engines have conventionally been known. Many of these devices, however, are bulky and less than perfect. Those large-sized conventional devices are not suited for use with relatively compact low-temperature refrigerating machines set in many places, such as magnetic-floating train operation systems utilizing superconductivity, for example.

By way of example, liquid helium is used as a refrigerant for the aforementioned low-temperature refrigerating machine. The refrigerant is cooled by adiabatic expansion in the adiabatic expansion engine, and mechanical output or energy equivalent to the amount of heat removed is led out of the refrigerating machine through the pistons of the engine. The refrigerating machine will not be able to enjoy uniform and stable operation unless the mechanical energy is absorbed by any means. The refrigerating machine of this type must, therefore, be provided with a power absorbing device for absorbing the energy of reciprocating motion of the pistons. Generally, in one such prior art device, reciprocating motion of pistons is converted into rotary motion to rotate a flywheel, and a load is applied to the flywheel. In one conventional method of applying the load, the flywheel is braked electromagnetically. In another method, an electric generator as well as the flywheel is rotated to convert the energy of the rotary motion into electric power, which is used for operating other equipment or dissipated as Joule heat. Although these methods are effective, they require a bulky flywheel and a large-sized electric generator for efficient power absorption, since the pistons move at a relatively low speed and the resultant rotary motion is slow. This leads to an increase in size of the refrigerating machine. In order to eliminate such awkwardness, there is proposed a speed-increasing gear which increases the speed of the rotary motion obtained from the reciprocating motion of the pistons, thereby rotating the power absorbing device at high speed. For this speed-increasing gear, there may be used a cycloidal speed-increasing gear, harmonic drive unit, etc. These devices, however, are large-sized, and require a bulky coupling member for connecting them with other rotating mechanisms, thus failing to provide a compact refrigerating machine. Accordingly, there is a continued demand for the development of compact low-temperature refrigerating machines.

SUMMARY OF THE INVENTION

The object of this invention is to provide a power absorbing device reduced in size and capable of absorbing the mechanical power produced by pistons of a reciprocating adiabatic expansion engine of a low-temperature refrigerating machine after converting the power into electric energy.

In order to attain the above object, a power absorbing device of this invention is so constructed that a converter for converting reciprocating motion of pistons into rotatory motion is provided with a cylindrical cam having a hollow space therein, and a speed-increasing gear for increasing the speed of the rotatory motion for high-speed operation of an electric generator is disposed in the hollow space inside the cylindrical cam.

Since the speed-increasing gear is located inside the cylindrical cam, as described above, the hollow space inside the cylindrical cam, which is not used effectively in the prior art device, can be put to a good use. Accordingly, the power absorbing device may be improved in compactness. Incorporated in the cylindrical cam, moreover, the speed-increasing gear can be assembled integrally with the cam, so that these two components may be removed from or set in the device as one block. Thus, assembly and repair of these components may easily be achieved by incorporating such one block in the device and by replacing it with new one, respectively.

Further, by combining the electric generator with the speed-increasing gear in the cylindrical cam, these three components may be assembled or replaced as one united body. Thus, the assembly and repair of the device may additionally be facilitated.

DETAILED DESCRIPTION OF THE PREFERRED EMBODIMENT

Figure 1:
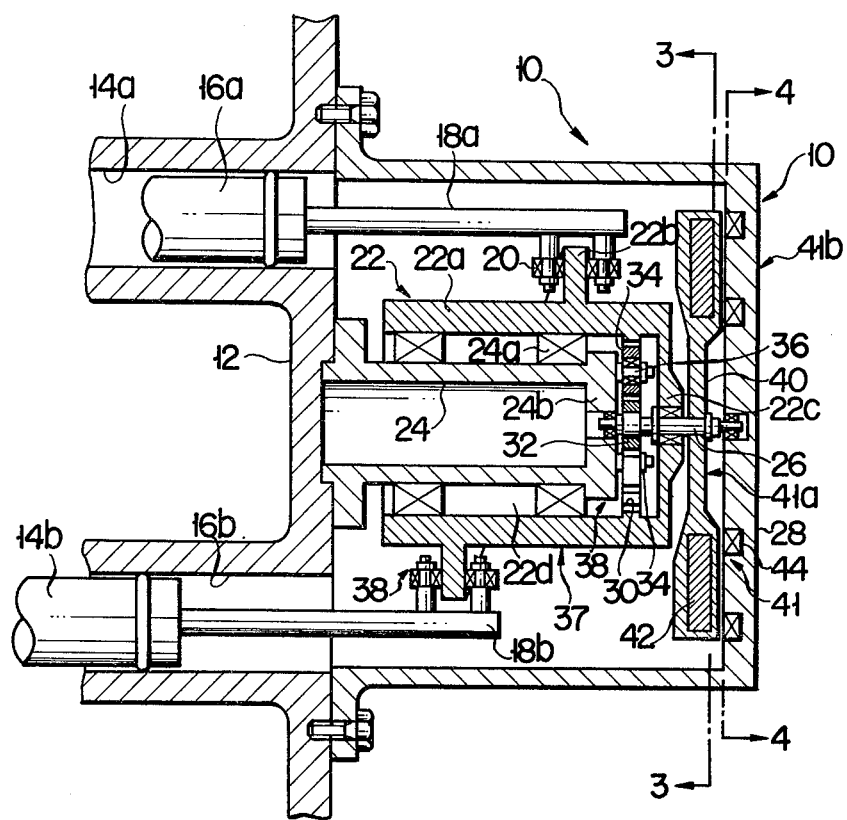
FIG. 1 is a sectional view of a power absorbing device according to an embodiment of this invention.

Now there will be described a power absorbing device 10 according to an embodiment of this invention. In FIG. 1, pistons 16a and 16b capable of reciprocating motion are inserted in cylinders 14a and 14b arranged in a housing 12 of a reciprocating adiabatic expansion engine. The tip ends of coupling rods 18a and 18b of the pistons 16a and 16b are coupled with a cylindrical cam 22 by means of bearings 20. The cylindrical cam 22 includes a cylindrical body 22a and annular plate 22b formed on the cylindrical body 22a at an angle thereto and is driven to rotate by the reciprocating motion of the pistons 16a and 16b. Thus, the cylindrical cam 22 serves as a converter 37 to convert reciprocating motion into rotatory motion. A shaft body 24 coaxial with the cylindrical cam 22 protrudes from the housing 12 so that the cylindrical cam 22 is rotatably fitted outside the shaft body 24 by means of bearings 24a. As shown in FIG. 1, the coupling between the pistons 16a and 16b and the cylindrical cam 22 is achieved through the coupling between the tip ends of the pistons 16a and 16b and the annular plate 22b by means of the bearings 20.

Figure 2:
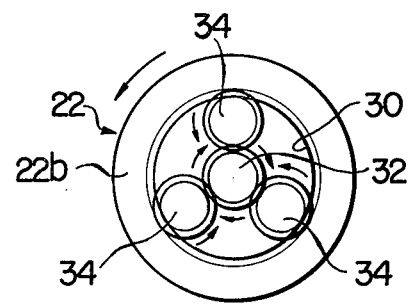
FIG. 2 is a diagram for illustrating gear combinations in the gear system of a speed-increasing gear used in the device of FIG. 1.

An output shaft 26 extending along the axial direction of the cylindrical cam 22 is rotatably attached thereto by means of an end portion 24b of the shaft body 24, an end portion 22c of the cylindrical cam 22, and a casing 28 attached to the housing 12. The cylindrical cam 22 has a hollow space 22d therein, and is provided on its inner peripheral surface with an internal gear 30 to rotate together with the cylindrical cam 22. An external gear 32 is fixed on the output shaft 26. Between the internal gear 30 and the external gear 32 as a sun gear, three planet gears 34 formed of external gears in mesh with the gears 30 and 32 are rotatably mounted on fixed shafts 36 which are immovably erected at regular angular intervals on the end portion 24b of the shaft body 24. FIG. 2 shows the relative positions of those gears as viewed from the right of FIG. 1. When the cylindrical cam 22 rotates in the direction of the arrow, i.e., counterclockwise, all the planet gears 34 rotate in the same direction (at this time, the fixed shafts of the planet gears 34 are immovable), while the sun gear 32 rotates clockwise. Hereupon, the speed-increasing gear ratio of a speed-increasing gear 38 including the gears 30, 34 and 32 depends on the gear ratio between the inner gear 30 and the sun gear 32, and the revolving speed of the output shaft 26 is higher than that of the cylindrical cam 22.

Between the cylindrical cam 22 and the casing 28, a flywheel 40 is fixed on the output shaft 26. The flywheel 40 is intended to smooth the rotations of the cylindrical cam 22 and the output shaft 26 and other rotating members lying between them and also to constitute a rotor 41a of an electric generator 41 mentioned later. A plurality of permanent magnets 42 are arranged in situ near the outer circumference of the flywheel 40, and a plurality of electric generating coils 44 constituting a stator 41b of the electric generator 41 are embedded in the inner side of the casing 28 facing the permanent magnets 42 at a given space. Since magnetic flux generated by the permanent magnets 42 is interlinked with the electric generating coils 44, a voltage is produced at the coils 44 when the flywheel 40 rotates. Accordingly, by leading out the voltage and suitably applying a load thereto, the mechanical output of the reciprocating adiabatic expansion engine of a low-temperature refrigerating machine can be converted into electric power and absorbed.

Figure 3:
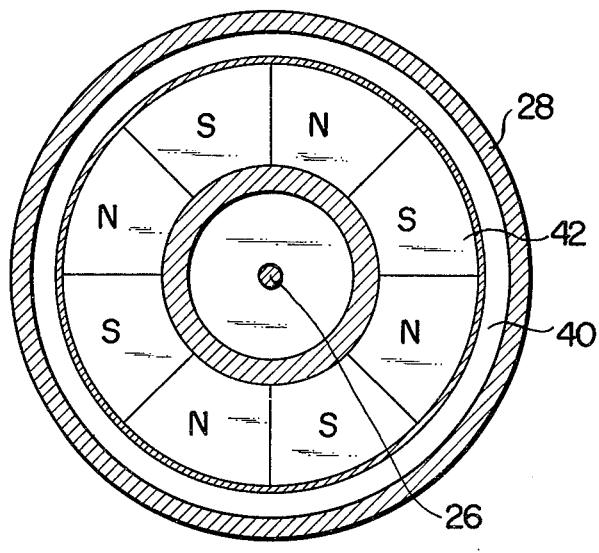
FIG. 3 is a sectional view taken along line 3—3 of FIG. 1.
Figure 4:
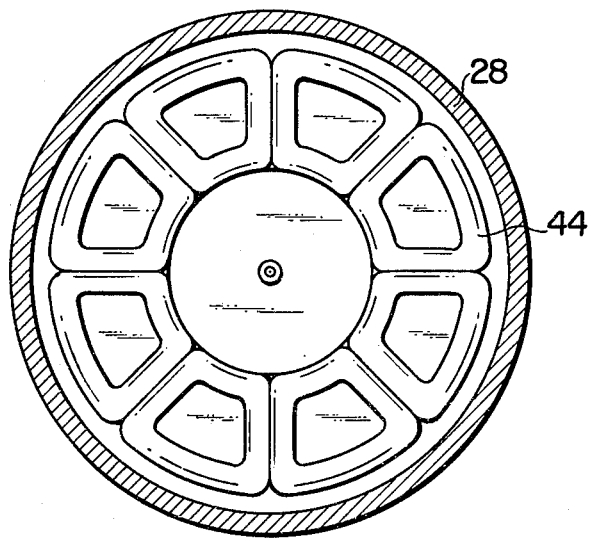
FIG. 4 is a sectional view taken along line 4—4 of FIG. 1.

FIG. 3 is a sectional view of the flywheel 40 as viewed from the left of FIG. 1. Preferably, the flywheel 40 is formed of paramagnetic material with great specific gravity. The flywheel 40 is fitted with eight substantially fan-shaped permanent magnets 42 which are magnetized to N and S as viewed from this side of the drawing so that each two adjacent magnetic poles have opposite polarity. In FIG. 1, the magnets 42 are shown as being embedded in the flywheel 40. Alternatively, however, they may be attached to the flywheel 40 by bonding, screwing or any other suitable method. FIG. 4 is a sectional view taken along line 4—4 of FIG. 1. As shown in FIG. 4, the coils 44 as many as the permanent magnets 42 are embedded in those positions in the end face of the casing 28 which are substantially opposed to the zones in which the magnets 42 are arranged. Thus, in such arrangement, the flywheel 40 and the permanent magnets 42 constitute the rotor 41a of the electric generator 41, and the electric generating coils 44 constitute the electric generating section or stator 41b of the electric generator 41.

In the power absorbing device 10 of the invention with the above-mentioned construction, the speed-increasing gear 38 is contained in the hollow space 24d inside the cylindrical cam 22. Accordingly, the hollow space 24d, which is not used effectively in the prior art device, can be put to a good use, leading to a reduction in size of the apparatus. With use of the planetary gear mechanism, the speed-increasing gear can be formed of rotating members with their rotating shafts capable of rotating in the same direction as the cylindrical cam 22. Therefore, the gear mechanism between the cylindrical cam 22 and the output shaft 26 can be simplified, and the speed-increasing gear can be made compact enough to be contained in the cylindrical cam 22. In the device of this invention, moreover, the flywheel 40 doubles as the rotor of the electric generator 41, and is subjected to a braking force if a load current is passed through the electric generating coils 44. Thus, the mechanical power generated from the adiabatic expansion engine can be electrically absorbed without producing any substantial heat at the flywheel 40.

Figure 5:
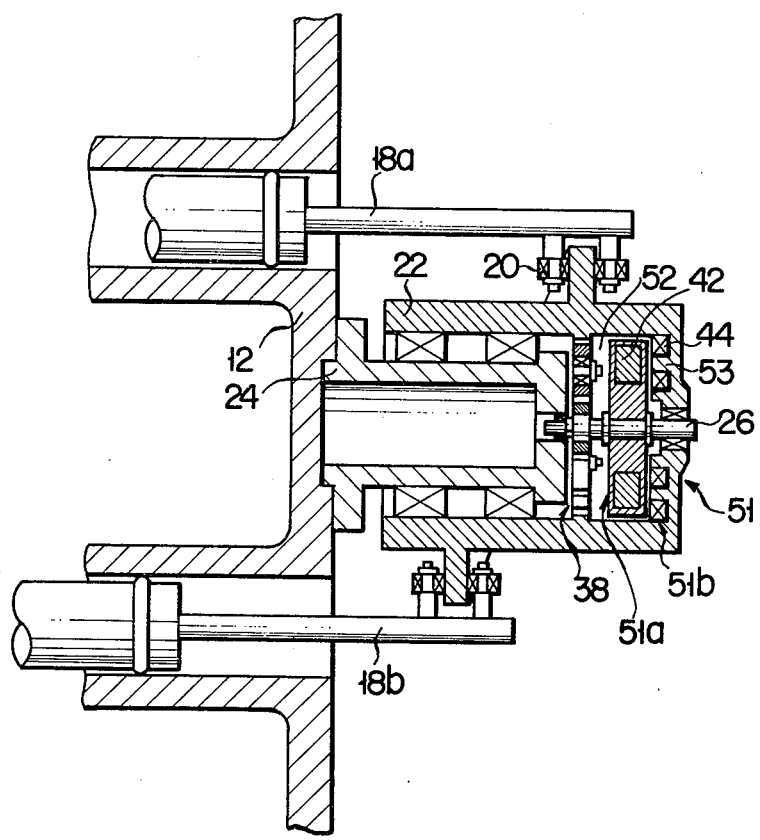
FIG. 5 is a sectional view of a power absorbing device according to another embodiment of the invention.

FIG. 5 shows a device in which an electric generator 51 as well as the speed-increasing gear 38 is incorporated in the cylindrical cam 22 of FIG. 1. In the device of FIG. 5, the cylindrical cam 22 is extended to the right to have a hollow space 52 defined therein. Inside the space 52, a rotor 51a of the electric generator 51 mounted on the output shaft 26. In an end face 53 at the right end of the cylindrical cam 22 are disposed the same electric generating coils 44 as shown in FIG. 4 which are opposed to the magnets 42 attached to the rotor 51a with the same polarity arrangement as shown in FIG. 3. In this embodiment, the electric generating coils 44 rotate together with the cylindrical cam 22 in the opposite direction to the rotor 51a, so that the voltage generated from the generating coils 44 must suitably be taken out of the generator 51 by well-known means. In other respects, there is no difference in construction between the embodiments of FIGS. 1 and 5, so that further detailed description is omitted herein.

As compared with the power absorbing device of FIG. 1, the device of FIG. 5 can more easily be assembled and repaired, since the electric generator 51 as well as the speed-increasing gear 38 is contained in the cylindrical cam 22.

What we claim is:

1. A power absorbing device for absorbing the mechanical energy of reciprocating motion of pistons of a reciprocating adiabatic expansion engine, comprising:
    a cylindrical cam for converting the reciprocating motion of said pistons into rotatory motion, said cylindrical cam having a hollow space therein;
    a speed-increasing gear in said hollow space for increasing the speed of said rotatory motion, said speed-increasing gear having an output shaft to rotate at an increased speed; and
    an electric generator including a rotor mounted on said output shaft to rotate and an electric generating section operating jointly with said rotor to supply an external load with electric power.

2. A power absorbing device according to claim 1, wherein said speed-increasing gear is a planetary speed-increasing gear including an internal gear formed on the inner peripheral surface of said cylindrical cam, a plurality of planet gears mounted immovably with respect to cylinders of said engine so as to rotate on their own axes and not to move or revolve, said output shaft coaxial with said cylindrical cam, and an external gear mounted on said output shaft and in mesh with said planet gears.

3. A power absorbing device according to claim 2, wherein said rotor includes a plurality of permanent magnets mounted on said output shaft to generate a magnetic field for the generation of electricity, and said electric generating section includes electric generating coils interlinked with the magnetic flux of said magnetic field.

4. A power absorbing device according to claim 3, wherein said electric generator is located in said hollow space inside said cylindrical cam, said rotor includes permanent magnets and is mounted on said output shaft inside said cylindrical cam, and said electric generating section includes electric generating coils formed in an end face of said cylindrical cam to face said rotor.

* * * * *